US012437742B2

(12) United States Patent
Bastyr et al.

(10) Patent No.: US 12,437,742 B2
(45) Date of Patent: Oct. 7, 2025

(54) SYSTEM AND METHOD FOR ELIMINATING NOISE CANCELLATION ARTIFACTS FROM HEAD MOVEMENT

(71) Applicant: Harman International Industries, Incorporated, Stamford, CT (US)

(72) Inventors: Kevin J. Bastyr, Franklin, MI (US); Tao Feng, Novi, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 289 days.

(21) Appl. No.: 18/117,772

(22) Filed: Mar. 6, 2023

(65) Prior Publication Data

US 2024/0304172 A1 Sep. 12, 2024

(51) Int. Cl.
*G10K 11/178* (2006.01)

(52) U.S. Cl.
CPC .. *G10K 11/17825* (2018.01); *G10K 11/17875* (2018.01); *G10K 2210/1282* (2013.01)

(58) Field of Classification Search
CPC ....... G10K 11/17813; G10K 11/17879; G10K 2210/1282; G10K 2210/128; H04S 7/303
See application file for complete search history.

(56) References Cited

U.S. PATENT DOCUMENTS 10,204,616 B1 * 2/2019 Malka .................... H04R 1/028
11,664,007 B1 5/2023 Bastyr
2014/0226831 A1 * 8/2014 Tzirkel-Hancock ......................... G10K 11/17883 381/71.7
2016/0035341 A1 * 2/2016 Warkentin ........... H04R 1/1083 381/71.4
2019/0251948 A1 * 8/2019 Hayashi ........... G10K 11/17857
2020/0074976 A1 * 3/2020 Torres .............. G10K 11/17853
(Continued)

FOREIGN PATENT DOCUMENTS

EP 3996086 B1 6/2023
WO 2022031279 A1 2/2022

OTHER PUBLICATIONS

Partial European Search Report for Application No. 24158845.8, dated Jan. 7, 2024, 16 Pages.
(Continued)

*Primary Examiner* — Jason R Kurr
(74) *Attorney, Agent, or Firm* — BROOKS KUSHMAN P.C.

(57) ABSTRACT

In at least one embodiment, an active noise cancellation (ANC) system is provided. The system includes at least one loudspeaker to project anti-noise sound in response to receiving a first anti-noise signal and at least one microphone to provide an error signal indicative of noise and the anti-noise sound. The system further includes a head tracker sensor to provide a first signal indicative of a position of a user's head and a first controllable filter programmed to modify a transfer function between the microphone and at least one remote microphone location to generate an estimated remote microphone error signal based at least on the error signal and the first signal. The system further includes a second controllable filter programmed to generate the first anti-noise signal to account for the position of the user's head at least based on the estimated remote microphone error signal.

15 Claims, 8 Drawing Sheets

(56) References Cited

U.S. PATENT DOCUMENTS

| | | | | |
|---|---|---|---|---|
| 2020/0366987 | A1* | 11/2020 | Furuta .............. | G10K 11/17817 |
| 2021/0217401 | A1 | 7/2021 | Christian et al. | |
| 2022/0208168 | A1* | 6/2022 | Aval ................. | G10K 11/17825 |

OTHER PUBLICATIONS

Extended European Search Report for Application No. 24158845.8, dated Sep. 30, 2024, 16 Pages.

* cited by examiner

SYSTEM AND METHOD FOR ELIMINATING NOISE CANCELLATION ARTIFACTS FROM HEAD MOVEMENT

TECHNICAL FIELD

Aspects disclosed herein generally relate to a system and method for eliminating noise cancellation artifacts due to head movement. These aspect and others will be discussed in more detail herein.

BACKGROUND

Active Noise Cancellation (ANC) systems attenuate undesired noise using feedforward and feedback structures to adaptively remove undesired noise within a listening environment, such as within a vehicle cabin. ANC systems generally cancel or reduce unwanted noise by generating cancellation sound waves to destructively interfere with the unwanted audible noise. Destructive interference results when noise and "anti-noise," which is largely identical in magnitude but opposite in phase to the noise, reduce the sound pressure level (SPL) at a location. In a vehicle cabin listening environment, potential sources of undesired noise come from the engine, the exhaust system, the interaction between the vehicle's tires and a road surface on which the vehicle is traveling, and/or sound radiated by the vibration of other parts of the vehicle. Therefore, unwanted noise varies with the speed, road conditions, and operating states of the vehicle.

A Road Noise Cancellation (RNC) system is a specific ANC system implemented on a vehicle to minimize undesirable road noise inside the vehicle cabin. RNC systems use vibration sensors to sense road induced vibration generated from the tire and road interface that leads to unwanted audible road noise. This unwanted road noise inside the cabin is then cancelled, or reduced in level, by using loudspeakers to generate sound waves that are ideally opposite in phase and ideally identical in magnitude to the noise to be reduced at one or more listeners' ears. Cancelling such road noise results in a more pleasurable ride for vehicle passengers, and such cancellation enables vehicle manufacturers to use lightweight materials, thereby decreasing energy consumption and reducing emissions.

An Engine Order Cancellation (EOC) system is a specific ANC system implemented on a vehicle to minimize undesirable engine noise inside the vehicle cabin. EOC systems use a non-acoustic signal, such as an engine speed sensor, to generate a signal representative of the engine crankshaft rotational speed in revolutions-per-minute (RPM) as a reference. This reference signal is used to generate sound waves that are ideally opposite in phase to the engine noise that is audible in the vehicle interior. Because EOC systems use a signal from an RPM sensor, the EOC systems do not require vibration sensors.

RNC systems are typically designed to cancel broadband signals, while EOC systems are designed and optimized to cancel narrowband signals, such as individual engine orders. ANC systems within a vehicle may provide both RNC and EOC technologies. Such vehicle-based ANC systems are typically Least Mean Square (LMS) adaptive feed-forward systems that continuously adapt W-filters based on noise inputs (e.g., acceleration inputs from the vibration sensors in an RNC system) and signals of physical microphones located in various positions inside the vehicle's cabin. A feature of LMS-based feed-forward ANC systems and corresponding algorithms is the storage of an impulse response, or secondary path, between each physical or virtual microphone and each anti-noise speaker in the system. The secondary path is the transfer function between an anti-noise generating speaker and a microphone.

A virtual or remote microphone technique is a technique in which an ANC system estimates an error signal generated by an imaginary or virtual or remote microphone at a location where no real physical microphone is located, based on the error signals received from one or more real physical microphones. This virtual or remote microphone technique can improve noise cancellation at a listener's ears even when no physical microphone is actually located there.

Road Noise Cancellation (RNC) and Engine Order Cancellation (EOC) may not adapt as fast as a vehicle occupant can move his/her head. In this sense, occupants may hear a spatial variation of the noise field and anti-noise field as the occupants moves their head when seated in seats having headrest speakers that create anti-noise. This spatial variation sounds very bad, particularly at a high frequency, because the sound field varies dramatically with small changes the head position (i.e., the spatial variation changes from noise cancellation to noise boosting and back to noise cancellation over several inches of head movement). Various automotive Original Equipment Manufacturers (OEMs) have observed that seat-based noise cancellation systems exhibit this undesirable high frequency anomaly, which makes seat loudspeaker-based noise cancellation systems undesirable for consumers.

SUMMARY

In at least one embodiment, an active noise cancellation (ANC) system is provided. The system includes at least one loudspeaker to project anti-noise sound within a cabin of a vehicle in response to receiving a first anti-noise signal and at least one microphone to provide an error signal indicative of noise and the anti-noise sound within the cabin. The system further includes a head tracker sensor to provide a first signal indicative of a position of a user's head in a vehicle and a first controllable filter programmed to modify a transfer function between the at least one microphone and at least one remote microphone location to generate an estimated remote microphone error signal based at least on the error signal and the first signal. The system further includes a second controllable filter programmed to generate the first anti-noise signal to account for the position of the user's head in the vehicle at least based on the estimated remote microphone error signal.

In at least one embodiment, a method for performing active noise cancellation (ANC) is provided. The method includes transmitting anti-noise sound within a cabin of a vehicle via a loudspeaker in response a first anti-noise signal and providing an error signal indicative of noise and the anti-noise sound within the cabin. The method further includes providing, via a head tracking sensor, a first signal indicative of a position of a user's head in a vehicle and modifying, via a first controllable filter, a transfer function to generate an estimated remote microphone error signal based at least on the error signal and the first signal. The method further includes generating, via a second controllable filter, the first anti-noise signal to account for the position of the user's head in the vehicle at least based on the estimated remote microphone error signal.

In at least one embodiment, an active noise cancellation (ANC) system is provided. The system includes at least one loudspeaker to project anti-noise sound within a cabin of a vehicle in response to receiving a first anti-noise signal and at least one microphone to provide an error signal indicative of noise and the anti-noise sound within the cabin. The system further includes a head tracker sensor to provide a first signal indicative of a position of a user's head in a vehicle and a first controllable filter programmed to generate the first anti-noise signal to in the vehicle at least based on the estimated remote microphone error signal. The system further includes a second controllable filter programmed to modify the first anti-noise signal based on the position of the user's head.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
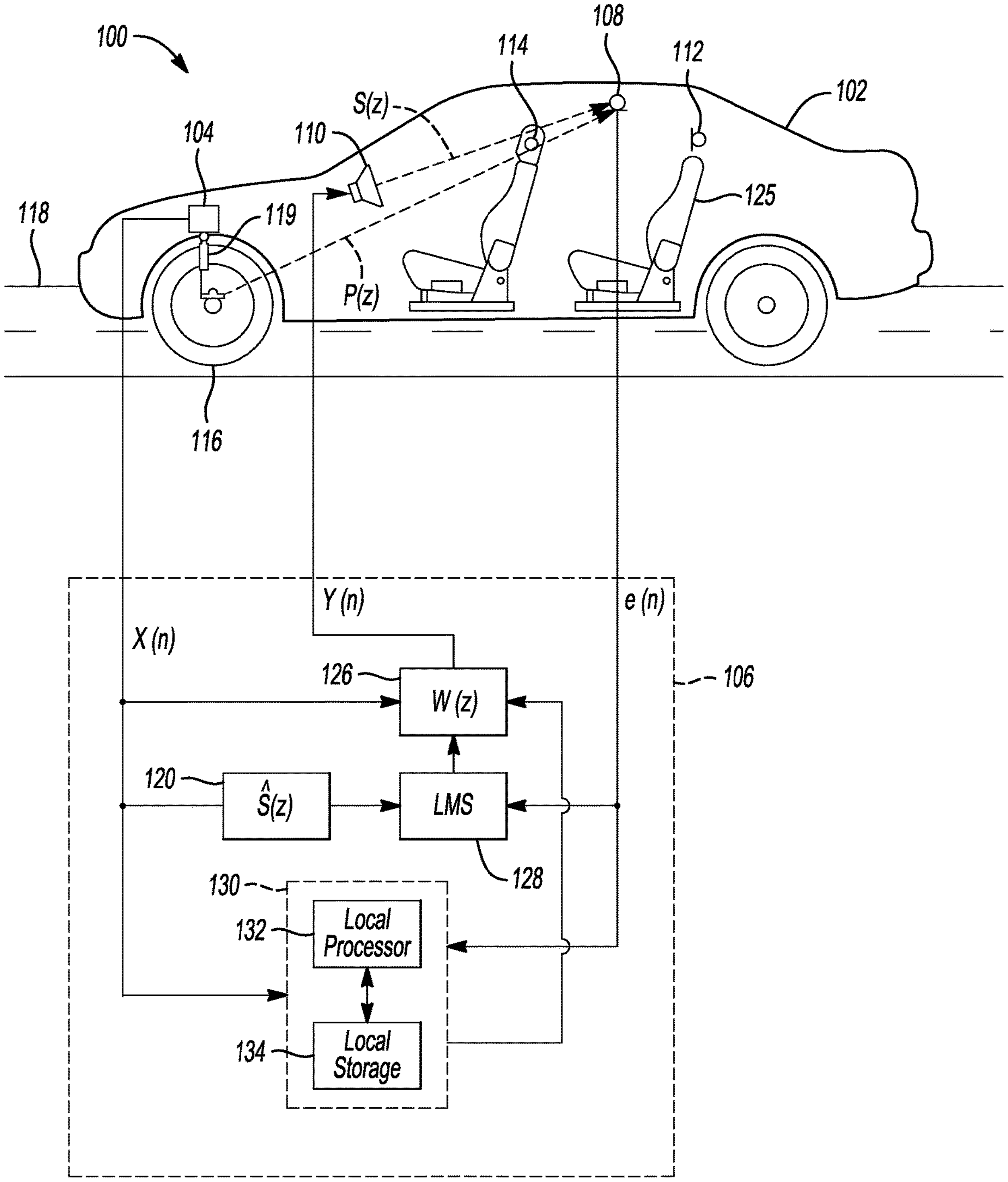
FIG. 1 is a schematic diagram of a vehicle having an active noise cancellation (ANC) system including a road noise cancellation (RNC) and a remote microphone, in accordance with one or more embodiments.

With reference to FIG. 1, a RNC system is illustrated in accordance with one or more embodiments and generally represented by numeral 100. The RNC system 100 is depicted within a vehicle 102 having one or more vibration sensors 104. The vibration sensors 104 are disposed throughout the vehicle 102 to monitor the vibratory behavior of the vehicle's suspension, subframe, as well as other axle and chassis components. The RNC system 100 may be integrated with a broadband adaptive feed-forward active noise cancellation (ANC) system 106 that generates anti-noise by adaptively filtering the signals from the vibration sensors 104 using one or more physical microphones 108. The anti-noise signal may then be played through one or more loudspeakers 110 to become sound within a room, such as a passenger cabin of the vehicle 102. S(z) represents a transfer function between a single loudspeaker 110 and a single microphone 108. The ANC system 106 evaluates measured signals to determine the resonance frequency of each loudspeaker 110, and adaptively adjusts a secondary path parameter based on the resonance frequency to limit or eliminate noise boosting in the affected frequency ranges.

While FIG. 1 shows a single vibration sensor 104, microphone 108, and loudspeaker 110 for simplicity purposes only, it should be noted that typical RNC systems use multiple vibration sensors 104 (e.g., ten or more), microphones 108 (e.g., four to six), and loudspeakers 110 (e.g., four to eight). The ANC system 106 may also include one or more remote microphones 112, 114 that are used for adapting anti-noise signal(s) that are optimized for the occupants in the vehicle 102, according to one or more embodiments.

The vibration sensors 104 may include, but are not limited to, accelerometers, force gauges, geophones, linear variable differential transformers, strain gauges, and load cells. Accelerometers, for example, are devices whose output signal amplitude is proportional to acceleration. A wide variety of accelerometers are available for use in RNC systems. These include accelerometers that are sensitive to vibration in one, two and three typically orthogonal directions. These multi-axis accelerometers typically have a separate electrical output (or channel) for vibration sensed in their X-direction, Y-direction and Z-direction. Single-axis and multi-axis accelerometers, therefore, may be used as vibration sensors 104 to detect the magnitude and phase of acceleration and may also be used to sense orientation, motion, and vibration.

Noise and vibration that originates from a wheel 116 moving on a road surface 118 may be sensed by one or more of the vibration sensors 104 mechanically coupled to a suspension device 119 or a chassis component of the vehicle 102. The vibration sensor 104 may output a noise signal X(n), which is a vibration signal that represents the detected road-induced vibration. It should be noted that multiple vibration sensors are possible, and their signals may be used separately, or may be combined. In certain embodiments, a microphone may be used in place of a vibration sensor to output the noise signal X(n) indicative of noise generated from the interaction of the wheel 116 and the road surface 118. The noise signal X(n) may be filtered with a modeled transfer characteristic S'(z), which estimates the secondary path (i.e., the transfer function between an anti-noise loudspeaker 110 and a physical microphone 108), by a secondary path filter 120.

Road noise that originates from the interaction of the wheel 116 and the road surface 118 is also transferred, mechanically and/or acoustically, into the passenger cabin and is received by the one or more microphones 108 inside the vehicle 102. The one or more microphones 108 may, for example, be located in a headliner of the vehicle 102, or in some other suitable location to sense the acoustic noise field heard by occupants inside the vehicle 102, such as an occupant sitting on a rear seat 125. The road noise originating from the interaction of the road surface 118 and the wheel 116 is transferred to the microphone 108 according to a transfer characteristic P(z), which represents the primary path (i.e., the transfer function between an actual noise source and a physical microphone).

The microphone 108 may output an error signal e(n) representing the sound present in the cabin of the vehicle 102 as detected by the microphone 108, including noise and anti-noise. In the RNC system 100, an adaptive transfer characteristic W(z) of a controllable filter 126 may be controlled by adaptive filter controller 128, which may operate according to a known least mean square (LMS) algorithm based on the error signal e(n) and the noise signal X(n) filtered with the modeled transfer characteristic $\hat{S}(z)$, by the secondary path filter 120. The controllable filter 126 is often referred to as a W-filter. An anti-noise signal Y(n) may be generated by the controllable filter or filters 126 and the vibration signal, or a combination of vibration signals X(n). The anti-noise signal Y(n) ideally has a waveform such that when played through the loudspeaker 110, anti-noise is generated near the occupants' ears and the microphone 108, that is substantially opposite in phase and identical in magnitude to that of the road noise audible to the occupants of the vehicle cabin. The anti-noise from the loudspeaker 110 may combine with road noise in the vehicle cabin near the microphone 108 resulting in a reduction of road noise-induced sound pressure levels (SPL) at this location. In certain embodiments, the RNC system 100 may receive sensor signals from other acoustic sensors in the passenger cabin, such as an acoustic energy sensor, an acoustic intensity sensor, or an acoustic particle velocity or acceleration sensor to generate error signal e(n).

While the vehicle 102 is under operation, at least one controller 130 (hereafter "the controller 130") may collect and process the data from the vibration sensors 104 and the microphones 108. The controller 130 includes a processor 132 and storage 134. The processor 132 collects and processes the data to construct a database or map including data and/or parameters to be used by the vehicle 102. The data collected may be stored locally in the storage 134, or in the cloud, for future use by the vehicle 102. Examples of the types of data related to the RNC or EOC system 106 that may be useful to store locally at storage 134 include, but are not limited to, driver or other occupant head location, history of a head location at multiple points in time, rate of change of head location or of head rotation, and ear canal opening location, history or rate of change of position or rotation.

Although the controller 130 is shown as a single controller, it may include multiple controllers, or it may be embodied as software code within one or more other controllers, such as the adaptive filter controller 128. The controller 130 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in modules to perform certain functions. Any one or more of the controllers or devices described herein include computer executable instructions that may be compiled or interpreted from computer programs created using a variety of programming languages and/or technologies. In general, a processor, e.g., the processor 132 receives instructions, for example from a memory, e.g., the storage 134, a computer-readable medium, or the like, and executes the instructions. A processing unit is a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 130 also includes predetermined data, or "look up tables" that are stored within the memory, according to one or more embodiments.

As previously described, typical RNC systems may use several vibration sensors, microphones and loudspeakers to sense structure-borne vibratory behavior of a vehicle and generate anti-noise. The vibration sensors may be multi-axis accelerometers having multiple output channels. For instance, triaxial accelerometers typically have a separate electrical output for vibrations sensed in their X-direction, Y-direction, and Z-direction. A typical configuration for an RNC system may have, for example, six error microphones, six loudspeakers, and twelve channels of acceleration signals coming from four triaxial accelerometers or six dual-axis accelerometers. Therefore, the RNC system will also include multiple S'(z) filters (e.g., secondary path filters 120, or $\hat{S}(z)$ filters) and multiple W(z) filters (e.g., controllable filters 126).

The simplified RNC system schematic depicted in FIG. 1 shows one secondary path, represented by S(z), between the loudspeaker 110 and the microphone 108. As previously mentioned, RNC systems typically have multiple loudspeakers, microphones and vibration sensors. Accordingly, a six-speaker, six-microphone RNC system will have thirty-six total secondary paths (i.e., 6×6). Correspondingly, the six-speaker, six-microphone RNC system may likewise have thirty-six $\hat{S}(z)$ filters (i.e., secondary path filters 120), which estimate the transfer function for each secondary path. As shown in FIG. 1, an RNC system will also have one W(z) filter (i.e., controllable filter 126) between each noise signal X(n) from a vibration sensor (i.e., accelerometer) 104 and each loudspeaker 110. Accordingly, a twelve-accelerometer signal, six-speaker RNC system may have seventy-two W(z) filters. The relationship between the number of accelerometer signals, loudspeakers, and W(z) filters is illustrated in FIG. 2.

Figure 2:
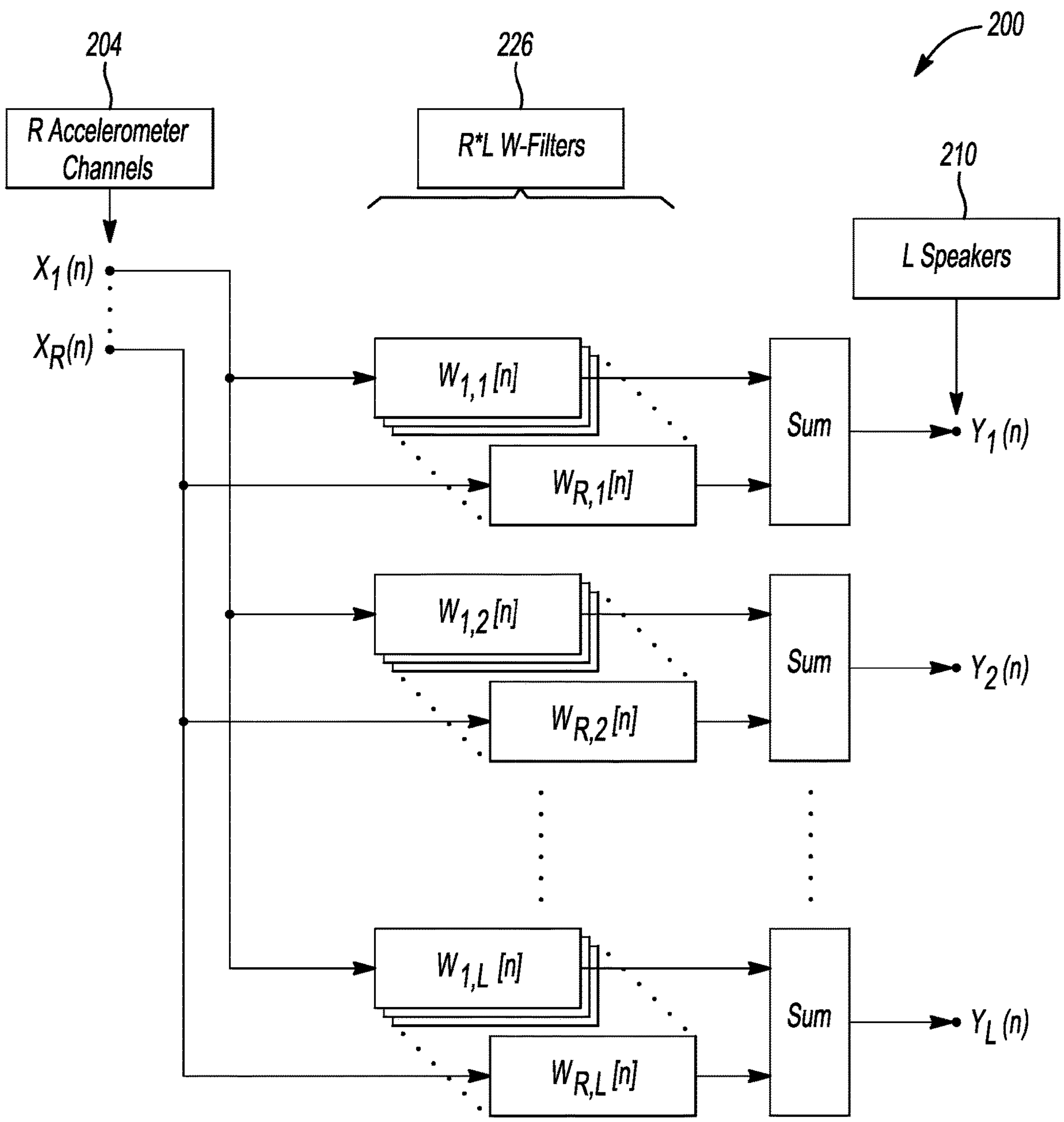
FIG. 2 is a sample schematic diagram demonstrating relevant portions of an RNC system scaled to include R accelerometer signals and L loudspeaker signals.

FIG. 2 is a sample schematic diagram demonstrating relevant portions of an RNC system 200 scaled to include R accelerometer signals [X1(*n*), X2(*n*), . . . XR(n)] from accelerometers 204 and L loudspeaker signals [Y1(*n*), Y2(*n*), . . . YL(n)] from loudspeakers 210. Accordingly, the RNC system 200 may include R*L controllable filters (or W-filters) 226 between each of the accelerometer signals and each of the loudspeakers. As an example, an RNC system having twelve accelerometer outputs (i.e., R=12) may employ six dual-axis accelerometers or four triaxial accelerometers. In the same example, a vehicle having six loudspeakers (i.e., L=6) for reproducing anti-noise, therefore, may use seventy-two W-filters in total. At each of the L loudspeakers, R W-filter outputs are summed to produce the loudspeaker's anti-noise signal Y(n). Each of the L loudspeakers may include an amplifier (not shown). In one or more embodiments, the R accelerometer signals filtered by the R W-filters are summed to create an electrical anti-noise signal y(n), which is fed to the amplifier to generate an amplified anti-noise signal Y(n) that is sent to a loudspeaker.

The ANC system 106 illustrated in FIG. 1 may also include an engine order cancellation (EOC) system. As mentioned above, EOC technology uses a non-acoustic signal such as an engine speed signal representative of the engine crankshaft rotational speed as a reference in order to generate sound that is opposite in phase to the engine noise audible in the vehicle interior. EOC systems may utilize a narrowband feed-forward ANC framework to generate anti-noise using an engine speed signal to guide the generation of an engine order signal identical in frequency to the engine order to be cancelled, and adaptively filtering it to create an anti-noise signal. After being transmitted via a secondary path from an anti-noise source to a listening position or physical microphone, the anti-noise ideally has the same amplitude, but opposite phase, as the combined sound generated by the engine and exhaust pipes after being filtered by the primary paths that extend from the engine to the listening position and from the exhaust pipe outlet to the listening position or physical or remote microphone position. Thus, at the place where a physical microphone resides in the vehicle cabin (i.e., most likely at or close to the listening position), the superposition of engine order noise and anti-noise would ideally become zero so that acoustic error signal received by the physical microphone would only record sound other than the (ideally cancelled) engine order or orders generated by the engine and exhaust.

Commonly, a non-acoustic sensor, for example an engine speed sensor, is used as a reference. Engine speed sensors may be, for example, Hall Effect sensors which are placed adjacent to a spinning steel disk. Other detection principles can be employed, such as optical sensors or inductive sensors. The signal from the engine speed sensor can be used as a guiding signal for generating an arbitrary number of reference engine order signals corresponding to each of the engine orders. The reference engine orders form the basis for noise cancelling signals generated by the one or more narrowband adaptive feed-forward LMS blocks that form the EOC system.

Figure 3:
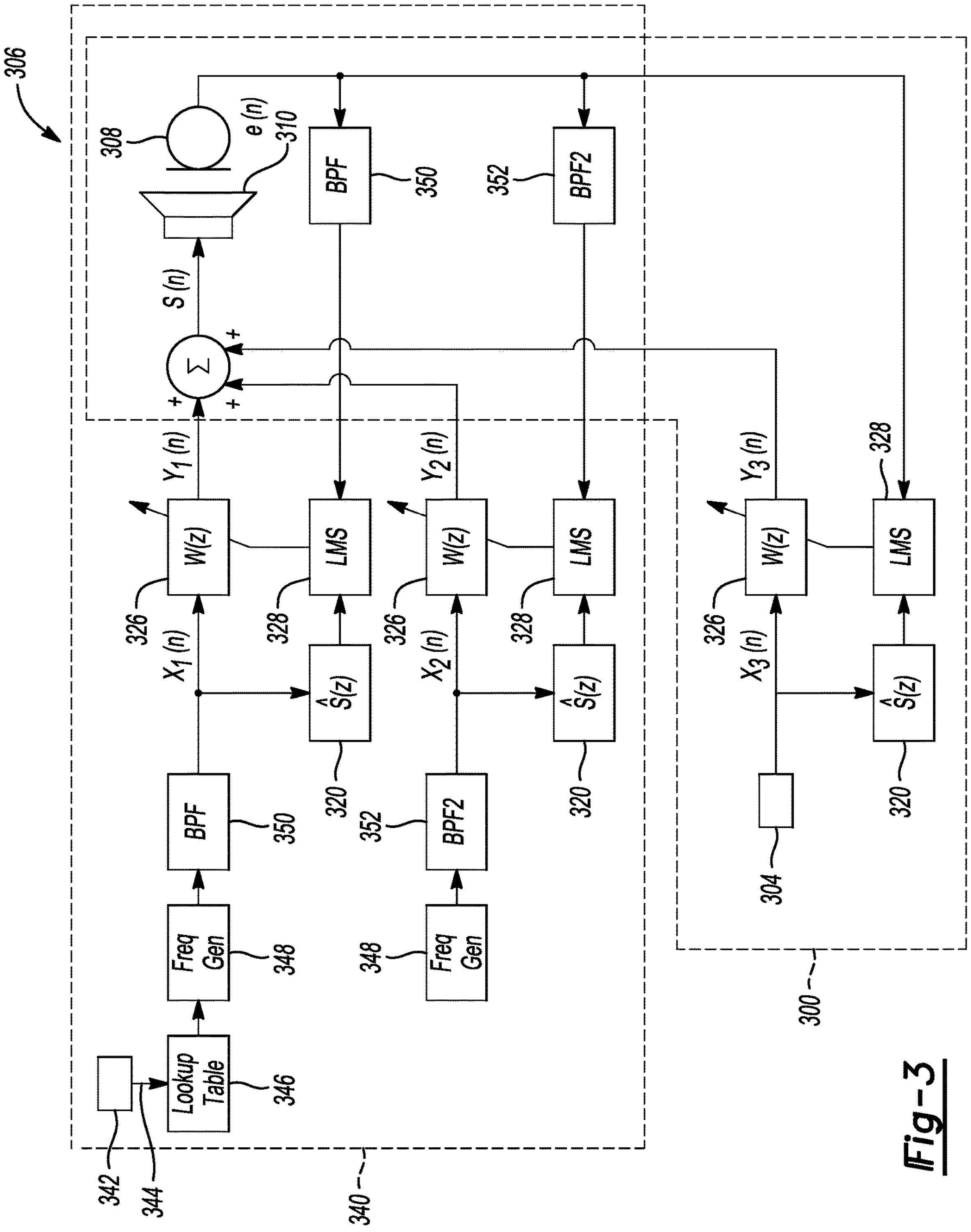
FIG. 3 is a sample schematic block diagram of an ANC system including an engine order cancellation (EOC) system and an RNC system.

FIG. 3 is a schematic block diagram illustrating an example of an ANC system 306, including both an RNC system 300 and an EOC system 340. Similar to RNC system 100, the RNC system 300 may include a vibration sensor 304, a physical microphone 308, a loudspeaker 310, a secondary path filter 320, a w-filter 326, and an adaptive filter controller 328, consistent with operation of the vibration sensor 104, the physical microphone 108, the loudspeaker 110, the secondary path filter 120, the w-filter 126, and the adaptive filter controller 128, respectively, discussed above.

The EOC system 340 may include an engine speed sensor 342 to provide an engine speed signal 344 (e.g., a square-wave signal) indicative of rotation of an engine crank shaft or other rotating shaft such as the drive shaft, half shafts or other shafts whose rotational rate is aligned with vibrations coupled to vehicle components that lead to noise in the passenger cabin. In some embodiments, the engine speed signal 344 may be obtained from a vehicle network bus (not shown). As the radiated engine orders are directly proportional to the crank shaft RPM, the engine speed signal 344 is representative of the frequencies produced by the engine and exhaust system. Thus, the signal from the engine speed sensor 342 may be used to generate reference engine order signals corresponding to each of the engine orders for the vehicle. Accordingly, the engine speed signal 344 may be used in conjunction with a lookup table 346 of Engine Speed (RPM) vs. Engine Order Frequency, which provides a list of engine orders radiated at each engine speed. The frequency generator 348 may take as an input the Engine Speed (RPM) and generate a sine wave for each order based on this lookup table 346.

The frequency of a given engine order at the sensed Engine Speed (RPM), as retrieved from the lookup table 346, may be supplied to a frequency generator 348, thereby generating a sine wave at the given frequency. This sine wave represents a noise signal X(n) indicative of engine order noise for a given engine order. Similar to the RNC system 300, this noise signal X(n) from the frequency generator 348 may be sent to an adaptive controllable filter 326, or W-filter, which provides a corresponding anti-noise signal Y(n) to the loudspeaker 310. As shown, various components of this narrow-band, EOC system 340 may be identical to the broadband RNC system 300, including the physical microphone 308, adaptive filter controller 328 and secondary path filter 320. The anti-noise signal Y(n), broadcast by the loudspeaker 310 generates anti-noise that is substantially out of phase but identical in magnitude to the actual engine order noise at the location of a listener's ear, which may be in close proximity to a physical microphone 308, thereby reducing the sound amplitude of the engine order. Because engine order noise is narrow band, the error signal e(n) may be filtered by optional bandpass filter 350 prior to passing into the LMS-based adaptive filter controller 328. In an embodiment, proper operation of the LMS adaptive filter controller 328 is achieved when the noise signal X(n) output by the frequency generator 348 is bandpass filtered using the same bandpass filter parameters.

In order to simultaneously reduce the amplitude of multiple engine orders, the EOC system 340 may include multiple frequency generators 348 for generating a noise signal X(n) for each engine order based on the engine speed signal 344. As an example, FIG. 3 shows a two order EOC system having two such frequency generators for generating a unique noise signal (e.g., X1(*n*), X2(*n*), etc.) for each engine order based on engine speed. Because the frequency of the two engine orders differ, the optional bandpass filters 350, 352 (labeled BPF and BPF2) have different high- and low-pass filter corner frequencies. The number of frequency generators and corresponding noise-cancellation components will vary based on the number of engine orders to be cancelled for a particular engine of the vehicle. As the two-order EOC system 340 is combined with the RNC system 300 to form the ANC system 306, the anti-noise signals Y(n) output from the three controllable filters 326 are summed and sent to the loudspeaker 310 as a loudspeaker signal S(n). Similarly, the error signal e(n) from the physical microphone 308 may be sent to the three LMS adaptive filter controllers 328. It may also be straight forward to implement an EOC or RNC algorithm using the so-called Modified Fx-LMS algorithm.

Figure 4:
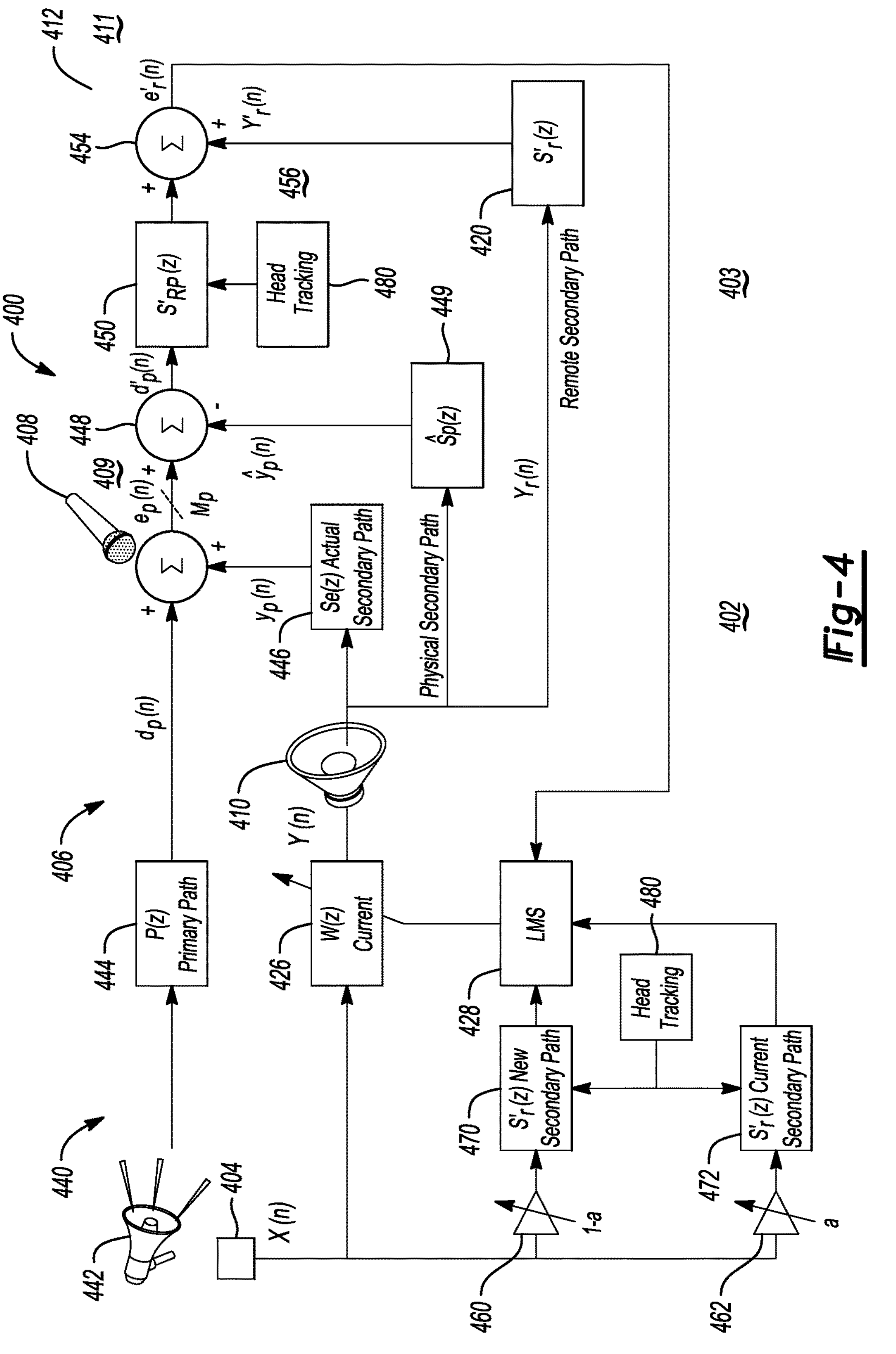
FIG. 4 depicts a schematic block diagram representing an EOC or RNC system of an ANC system in accordance with one embodiment.

FIG. 4 is a schematic block diagram of a vehicle-based remote microphone (RM) ANC system 406 showing many of the key ANC system parameters that may be used to, inter alia, improve noise cancellation or limit or eliminate noise boosting. For ease of explanation, the ANC system 406 illustrated in FIG. 4 is shown with components and features of an RNC system 400 and an EOC system 440. Accordingly, the RM ANC system 406 is a schematic representation of an RNC and/or EOC system, such as those described in connection with FIGS. 1-3, featuring additional system components of the RM ANC system 406. Similar components may be numbered using a similar convention. In general, at least one first controller 402 (hereafter "the first controller 402") may be used to execute any of the operations as set forth herein.

For instance, similar to ANC system 106, the RM ANC system 406 may include a vibration sensor 404 (e.g., accelerometer), a physical microphone 408, a controllable filter (or w-filter) 426, at least one controller 428 (or hereafter "an adaptive filter controller 428"), and a loudspeaker 410, consistent with the operation of the vibration sensor 104, the physical microphone 108, the w-filter 126, the adaptive filter controller 128, and the loudspeaker 110, respectively, discussed above. FIG. 4 also shows a primary path P(z) 444 and a secondary path Se(z) 446 in block form for illustrative purposes.

The RM ANC system 406 involves estimating a remote microphone 412 (or virtual microphone at a remote location 411. The remote microphone 412 corresponds to a remote microphone signal $e_r(n)$ generated by the system 406 that provides a signal estimate to estimate acoustic pressure at a different location than a physical microphone location 409, for example, at a location that is proximate to (or adjacent to) a listener's ears. The virtual or remote microphone 412 is not an actual microphone, but simply serves as a designation to illustrate a signal that is an estimate of the acoustic pressure that is proximate to a listener's ear. One example of a system that provides a virtual or remote microphone 412 is set forth in U.S. Ser. No. 17/730,906 (U.S. Publication No. ________) entitled "FAST ADAPTING HIGH FREQUENCY REMOTE MICROPHONE NOISE CANCELLATION" filed on Apr. 27, 2022 which is incorporated by reference in its entirety herein.

The RM ANC system 406 also includes a controllable filter 450 (or a PathPR filter or microphone transfer function 450). The physical microphone 408 is generally positioned at a physical mic location 409. The physical microphone 408 senses the acoustic pressure at the location 409. The remote microphone 412 as provided by the system 406 at the remote microphone location 411 is proximate to the user's ears. Thus, in this regard, the PathPR filter 450 which is also known as $S_{RP}(z)$, is used to generate an estimate of the primary noise to be cancelled at the remote microphone location 411 based on the measured noise at the location of the physical microphone 409. For example, the remote microphone 412 provides an estimated remote error signal $e_r(n)$ generated by the system 406 that is an estimate of the pressure at the location of the remote microphone 411.

The physical microphone 408 provides an error signal $e_p(n)$ that includes all the sound present at its location, such as the disturbance signal $d_p(n)$ intended to be cancelled, which includes road noise, engine and exhaust noise, plus the anti-noise from the loudspeaker 410, $y_p(n)$, and any extraneous sounds at the microphone location.

As noted above, the physical microphone 408 represents a microphone located at the actual microphone location 409 that would similarly sense all the sound at its location 409, such as the disturbance signal $d_p(n)$ to be cancelled, which includes road noise, engine, and exhaust noise, plus the anti-noise from the loudspeaker 410, $y_p(n)$, and extraneous sounds. Typically, there are multiple physical microphone locations 409, and multiple remote microphone locations 411. As suggested above, when operating the noise cancellation system, there is no actual microphone mounted at the remote microphone location 411. So, with the remote microphone technique, the pressure at the remote microphone locations 411 is estimated from the pressure at the physical microphone locations 409 to form the estimated remote error signal $e_r(n)$. It is recognized that the RM ANC system 406 may correspond to a RM EOC system 440 or an RM RNC system 400.

The physical microphone 408 senses both the noise $d_p(n)$ at its location 409 from a noise source 442 after traveling along a primary path P(z) 444 and the anti-noise $y_p(n)$ at its location from the loudspeaker 410 after traveling along the secondary path Se(z) 446. The physical microphone 408 provides a physical error signal $e_p(n)$, as shown by Equation 1:

$$e_p(n) = d_p(n) + y_p(n) \tag{1}$$

The RM EOC system 440 estimates the disturbance noise to be cancelled $d'_p(n)$ at the physical microphone location at block 448 (or adder 448). The ANC system 406 subtracts an estimate of the anti-noise at the physical microphone location $y'_p(n)$ (e.g., 409) from the physical error signal $e_p(n)$ to estimate the disturbance noise at the physical microphone location $d'_p(n)$, as shown by Equation 2:

$$d'_p(n) = e_p(n) - y'_p(n) \tag{2}$$

The RM EOC system 440 then estimates the disturbance noise to be cancelled at the remote microphone location $d'_r(n)$ at the PathPR filter 450 by convolving the estimated disturbance noise at the physical microphone location $d'_p(n)$ with the transfer function between the physical and remote microphone location H(z).

At adder (or block) 454, the RM ANC system 406 estimates the remote microphone error signal $e'_r(n)$ that would be present at the location 411 of the remote microphone 412 by adding an estimated disturbance noise to be cancelled at the remote microphone location $d'_r(n)$ with an estimate of the anti-noise at the location 411 $y'_r(n)$ as shown by Equation 3:

$$e'_r(n) = d'_r(n) + y'_r(n) \tag{3}$$

Combining Equations 1, 2 and 3 creates an estimate of the remote error microphone signal or signals, from the physical error signal or signals, the physical and remote microphone secondary paths and the transfer functions between the physical and remote locations (e.g., PathPR).

For an EOC system 440, similar to FIG. 3, the noise signal X(n) from the noise input, as derived from a combination of signals received from the RPM sensor 342, the lookup table 346, and the frequency generator 348. For an RNC system 400, the vibration sensor (or accelerometer) 404 outputs the noise signal X(n) directly. For either system, these noise signals X(n) may be filtered with a modeled transfer characteristic S'(z), using stored estimates of the remote secondary path as previously described, by the remote secondary path filter 472 to obtain a filtered noise signal X'(z). Moreover, a transfer characteristic W(z) of the controllable filter 426 (e.g., a W-filter) may be controlled by the LMS adaptive filter controller (or simply LMS controller) 428 to provide an adaptive filter 426. The LMS adaptive filter controller 428 receives the filtered noise signal X'(z) and the estimated remote error signal $e'_r(n)$ to adapt the W-filters to produce optimized noise cancellation at the location 411 of the remote microphone 412. The controllable filter 426 generates the anti-noise signal Y(n) based at least on the filtered noise signal X'(n). The adaptive filter controller 428 generates the W-filters in the controllable filter 426.

Similar to FIG. 2, the ANC system 406 is scaled to include R reference noise signals (e.g., accelerometer noise signals or frequency generator signals), L loudspeaker or loudspeaker signals, and M microphone error signals. Accordingly, the ANC system 406 may include R*L controllable filters (or W-filters) 426 and L anti-noise signals.

In general, noise cancellation systems such the ANC system 406 and the RNC system 440 provide the best noise cancellation at the locations for various error microphone. The noise cancellation performance decreases as distance from a single error microphone increases. In general, a user's ears are not typically located at the location 411 of the remote microphone location. The virtual or remote microphone technique may improve noise cancellation at locations other than the physical microphone locations (or the location 409 of the physical microphone 408). In general, the virtual microphone technique may include additional signal processing blocks that account for anti-noise difference between the physical location 409 of the microphone 408 and the location 411 of the virtual error microphone 412. The remote microphone technique includes at least the PathPR filter 450 to account for noise difference between physical and remote error mic locations 409, 411 respectively. One method to improve the noise cancellation performance for a listener who moves their head from one location to a second location involves tracking their head position and retrieving a predetermined new PathPR filter and a predetermined $S'_R(z)$ filter 450 for this new location from memory 403.

In one embodiment, the ANC system 406 includes a head tracking selector 453 that adjusts tuning parameters, such as, for example, the PathPR filter(s) 450 based on a need for improved noise cancellation from the ANC system 406 at the locations 409, 411 of the physical microphone 408 and the remote microphone 412. and further based on the operating conditions of the vehicle. A head tracking block 480 (or filter controller) is also coupled to the PathPR filter 450 to select a new predetermined PathPR filter from memory 403 to be used as the active PathPR filter 450. As noted above, the head tracking block 480 may be implemented as a head tracker and also serve as a filter controller to control the PathPR filter 450. Thus, this regard, the head tracking block 480 may control the PathPR filter 450. However, it is recognized that the filter controller may be implemented separately from the head tracking block 480 to control the PathPR filter 450. It is further recognized that the filter controller and corresponding look up table may be implemented in any processor and memory that is operably coupled with the ANC system 406. The head tracking selector block 453 may be coupled to a head tracker sensor 456 that monitors the location of an occupant's head. For example, the controller 402 may be operably coupled to the head tracker sensor 456 and provides a signal from the head tracker sensor 456 to the head tracker block 480. The signal provided from the head tracker sensor 456 to the head tracker block 480 may be indicative of the location of the occupant's head. In various examples, the head tracker sensor 456 includes one or more of a camera, a proximity sensor such as an infrared proximity sensor, a time-of-flight sensor, and/or a LIDAR or RADAR. These sensors may be used as a detector to determine the head disposition in terms of any one or more of distance, elevation, lateral position, coordinate, an angle of a yaw, pitch, roll, or tilt rotational axis, ear (pinna) position, ear canal opening position, or the like. The system 400 stores multiple PathPR filters 450 (or predetermined transfer functions or filter coefficients) in the memory 403, and the head tracking block 480 selects the filter (or the transfer function for the PathPR filter 450) appropriate for the current position of the head, in terms of yaw, pitch, roll, tilt, coordinate, pinnae position, ear canal opening position or the like.

In one embodiment, the system 406 may execute a method to transition the noise cancellation system 406 from the current secondary path 472 to a new secondary path 470 (also a filter controller 470) based on the disposition of the user's head. In the case that head movement necessitates an update to the stored secondary path (320, 472), the controller 402 may perform an abrupt transition from using one stored secondary path 472 to a new stored secondary path 470 that may lead to the divergence of W-filter 426. In this case, an additional secondary path (e.g., the new stored secondary path 470) and two cross fading gain blocks 460,462 are added to the noise cancellation system 400. The secondary path $S'_r(z)$ 470 is a controller filter that corresponds to a measured transfer function of the anti-noise path between the loudspeaker 410 and the remote microphone location 411. For optimal noise cancellation at the location of the ears of the passengers, both the PathPR filter 450 and the remote secondary path filter 470 belonging to the remote microphone location 411 at the location of the listener's ears is used in the system 406.

As noted above, the head tracking block 480 (or filter controller) is also coupled to the head tracker sensor 456. The head tracking block 480 outputs the new secondary path 470 (e.g., $S'_r(z)$new (or changes the filter coefficients of the new secondary path 470)) which is suitable for the new head position of the user that then provides an additional input to the adaptive filter controller 428. It is recognized that the incorporation of the first and the second cross fading blocks 460 and 462 and new secondary path block are optional. The ANC system 406 may omit first and second cross fading blocks 460 and 462 and may instantaneously swap from one to the next or new secondary path 470. The first and the second cross faders 460, 462 may operate in many predetermined states. In one embodiment, the controller 402 may immediately transition to a new secondary path, where the value, designated by "a" (see FIG. 4) is set to 0. In this case, by setting a=0, this sets the gain of the first cross fader 460 to unity, and the gain of second cross fader 462 to zero, effectively "shutting off" usage of the "old" current secondary path 472. In various embodiments, the value of "a" can be transitioned from one to zero over a period of, for example, one to six seconds, which leads to the transition from the "old" secondary path 472 to the new secondary path 470. Other values of "a" are possible, including but not limited to scaling "a" based on characteristics of the head movement velocity, or amplitude, etc. These three additional components to which enable a transition from an current secondary path to a new secondary path may be optionally added to other ANC systems as shown in connection with FIGS. 3,5,6 and 7.

In general, the listeners (or occupants) hear the sound that is present at the exact location of their ear canal openings. Because engine noise and road noise have a spatial variation throughout the passenger cabin in a vehicle, these noises are different at every location. Also, the engine and road anti-noise that is radiated from the loudspeakers have a spatial variation throughout the passenger cabin, due to the non-omnidirectional nature of sound radiation from loudspeakers and also due to acoustic modes (resonances) of the passenger cabin. Therefore, as a listener moves his/her head through the space in the cabin, both the noise and the anti-noise is changing from one location to the next, and so the amount of noise cancellation is changing, which is undesirable. This entails that there is a spatially uneven sound field, as there will be regions of better and worse destructive interference between the noise and anti-noise. It is predicted that noise boosting can easily occur, as the "cancellation zone" ($1/10^{th}$ wavelength) at 600 Hz may only be, for example, approximately 6 cm. Therefore, if an occupant moves his/her head 18 cm, noise boosting may unavoidably occur at this frequency. Due to the shorter wavelengths of higher frequency sound, this change in sound pressure level resulting from the variation of destructive interference as one rotates or translates his/her head is more pronounced at high frequencies.

One or more aspects disclosed herein may utilize a head tracking system and remote microphone technology to select an appropriate S'r(z) (e.g., new secondary path 472) and controllable filter 450 (or PathPR filter 450) from a list of pre-characterized, pre-stored values that were determined at a time the noise cancellation system was tuned. These new values of S'r(z) and selected controllable filter 450 are selected and "hot-swapped" into a Least Mean Square (LMS) system in real time, as the system 406 is running and continuously adapting the W-filters. As mentioned above, even though EOC systems may adapt in 100 ms, head movement and especially head rotation may be faster than this adaptation rate. Thus, in this regard, the EOC system 440 may not be able to "keep up" or "stay converged" on the optimal W-filters (or adaptive filters 426) after switching to a new set of coefficients for the PathPR filter 450 and to a secondary path (e.g., S'r(z)) for a particular head location during the brief periods of head movement. The situation with the RNC system 400 may be somewhat worse, as RNC adaptation takes roughly 100× as long as EOC's adaptation, due to the bandwidth of RNC being approximately 64× to 512× wider. That is, for EOC, one LMS system adapts a magnitude and phase of each of a particular engine order frequency of interest. For RNC, one LMS system adapts all 64, 128, 256, or 512 frequency-dependent magnitude and phase taps of the road noise, or similarly large number of time domain taps. This suggests that RNC will have a particularly difficult time adapting as fast as occupants can move their heads (with each new head position requiring a new value of for the secondary path 470 (or S'r(z)) and the coefficient(s) of the PathPR filter 450. During this adaptation time and right after head movement, the listeners in the vehicle 102 may exposed to sub-optimal noise cancellation, which may unfortunately include an undesirable noise boosting.

Figure 5:
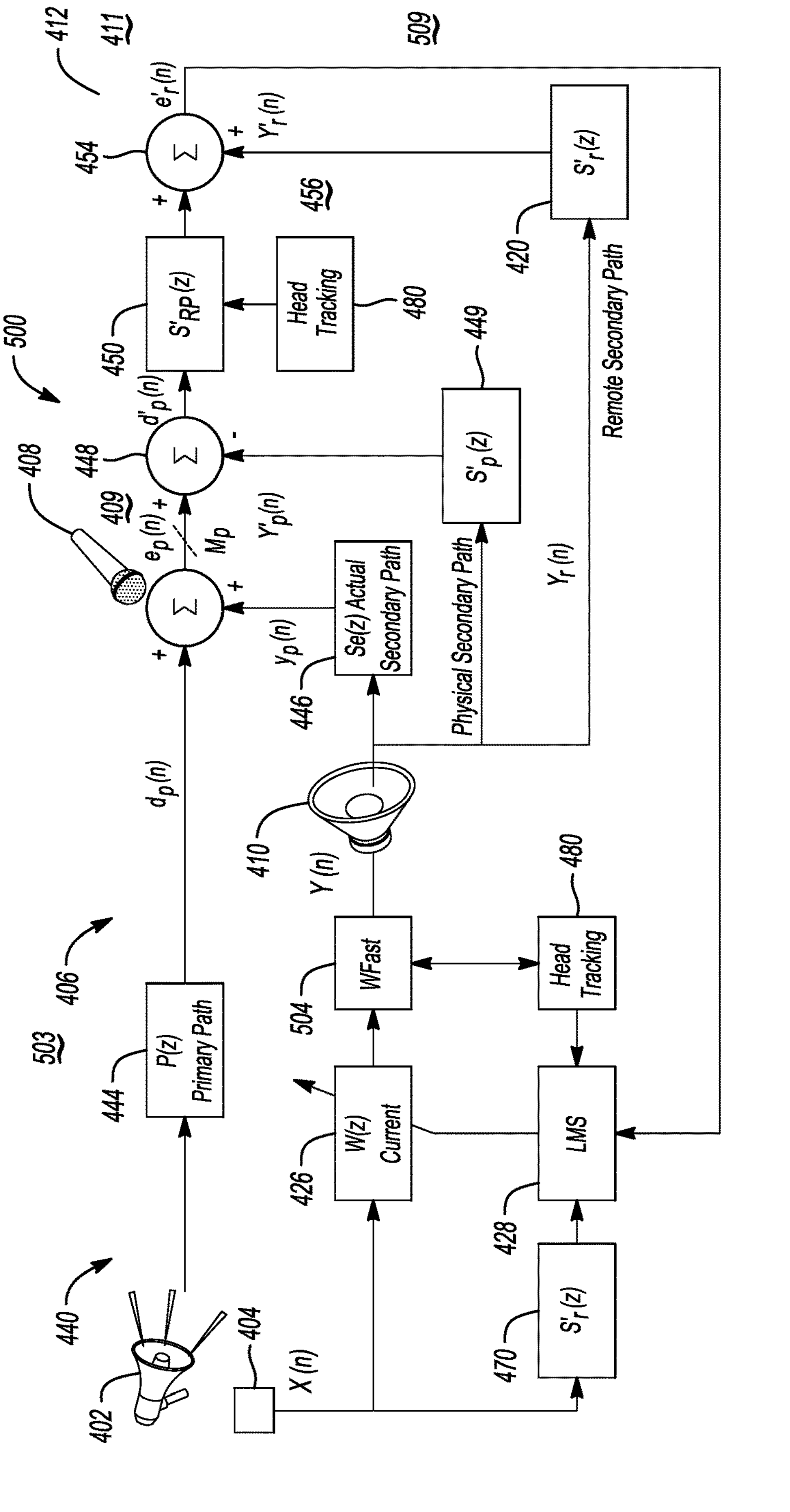
FIG. 5 depicts a system for eliminating noise cancellation artifacts due to head movement in accordance with another embodiment.
Figure 6:
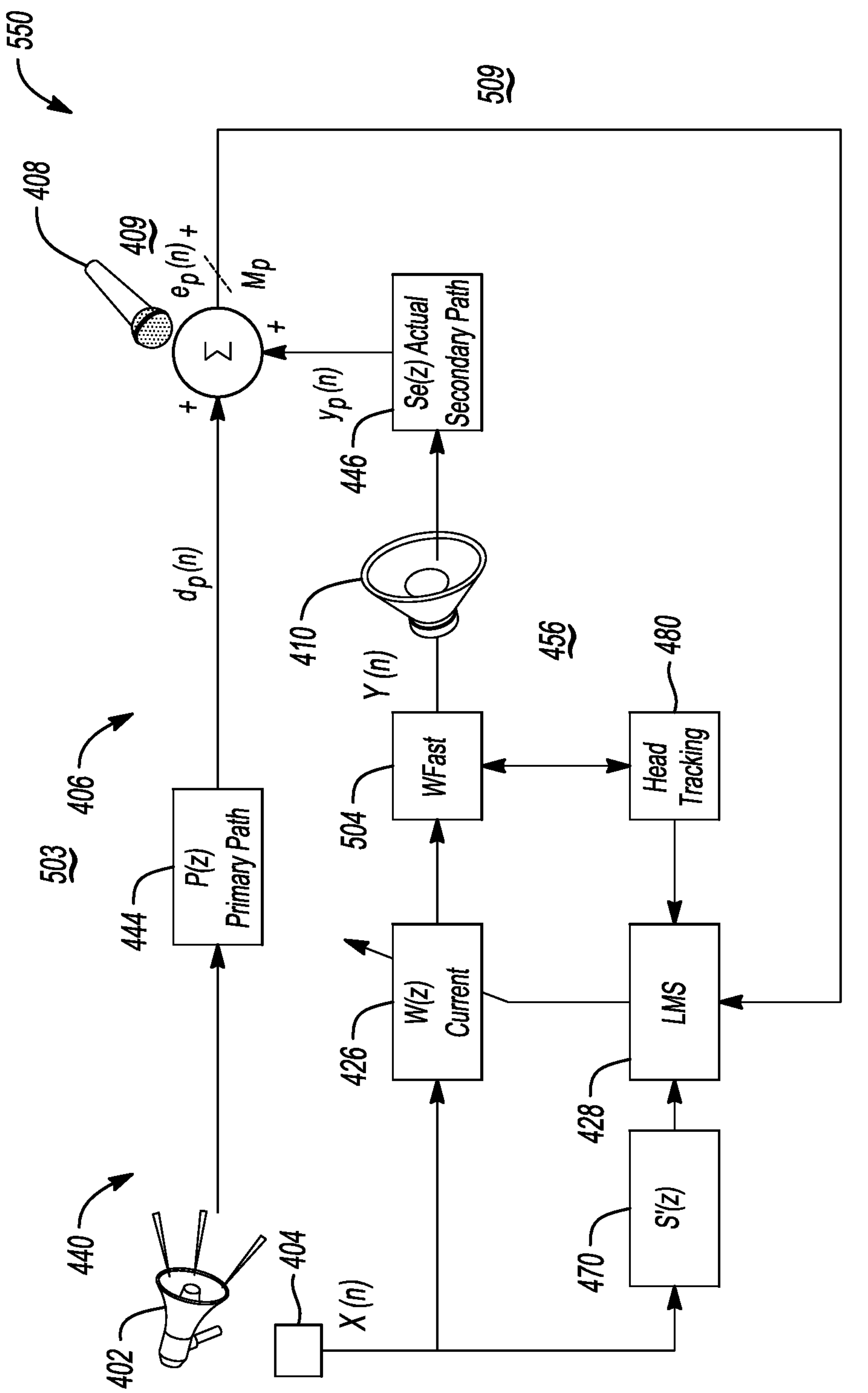
FIG. 6 depicts another system for eliminating noise cancellation artifacts due to head movement in accordance with another embodiment.

Road Noise Cancellation (RNC) and Engine Order Cancellation (EOC) may not adapt as fast as a vehicle occupant can move their head even when an active noise cancellation system (ANC) system transitions from various sets of filter coefficients for the PathPr filter 450 and another set of filter coefficients for the filter associated with the new secondary path S'r(z) 470 to account for a moving occupant head. To overcome this limit of adaptation speed, FIG. 5 illustrates an ANC system 500 that includes a fast-acting adaptive filter 504 (or the Wfast filter 504 which is also a controllable filter) which is used to filter an anti-noise signal (Y(n)) in the time or frequency domain. Such a fast-acting filter 504 can quickly account for a difference in noise and anti-noise at a new location of the head location much faster than waiting for an adaptive filter to converge after changing the coefficients for the PathPR filter 450 and the coefficients for the filter associated with the new secondary path S'r(z) 470. One problem associated with spatial variation of noise and anti-noise field may be especially apparent for high frequency RNC and EOC systems using seat-based loudspeakers, as such systems generally allow noise cancellation to be extended above the current 250-450 Hz, up to the 600-1000+ Hz region where the positional variation in these sound fields are especially large.

While the head tracking cross faders 460 and 462 as set forth in FIG. 4 aid the w-filter adaptation and may prevent undesirable artifacts, a similar cross fading technique (not shown) can be employed for the system 500 by hot-swapping PathPR's (e.g., switching filter coefficients for the PathPR filter 450), these cross faders may not expedite the adaptation of the W-filters after the selection and retrieval of new PathPR and S'r(z) values.

The ANC system 500 for improving noise cancellation during and after head movement and eliminating noise cancellation artifacts due to head movement in accordance with one embodiment. The system 500 is generally similar to the ANC system 400 as illustrated in connection with FIG. 4, with optional the blocks 460, 462, 472 and 480 being omitted. It is recognized that the blocks 460, 462, 472, and 480 may be included in system 500. The ANC system 500 further includes a headtracking block 502, the fast filter 504 (or Wfast filter), and at least one ANC controller 509 ("the controller 509"). The ANC controller 509 is generally programmed to perform any one or more operations of the ANC system 500 as will be discussed in more detail below. The ANC system 500 may overcome the adaptation rate limitation as noted above. For example, the fast filter 504 is positioned in a path to modify the signal that is transmitted to the loudspeaker 410 (e.g., in the path of the loudspeaker 410). It is recognized that the head tracking block 480 provides a signal to the fast filter 504. This also generally applies to FIGS. 5 and 6, and optionally to FIG. 7.

The ANC system 500 generally performs the following operations to determine the filter coefficients for the first filter (or Wfast filter) 504 to deliver an optimized ANC experience when a user's head moves from one location to another location. The controller 509 determines filter coefficients for the Wfast filter 504 that is based on a product of a first and second ratio, where the first ratio corresponds to anti-noise at the new head location and to anti-noise at the previous head location, and the second ratio corresponds to noise at the new location and noise at a previous head location. These ratios are based on stored impulse responses (IRs) of the noise to be canceled and an anti-noise source to multiple head locations that are stored in memory 503. That is, various values for the Wfast filter 504 are computed for various head locations in a 3D grid. For example, trained engineers can map the secondary path field and then noise field over a portion or all of the 3D space that the head can occupy. These locations can be a "Center of head" location, or two positions which are ear canal opening locations. These Wfast values for the Wfast filter 504 can be stored in memory 503 and should be oriented in the 3D space of the vehicle. Thus, a coordinate system may be useful in storing the values for the Wfast filter 504, and the origin of the coordinate system can be anywhere but having the origin at the location 411 of the remote microphone 412 may be desirable choice for measurement purposes. In an embodiment, the values for the Wfast filter 504 may be computed in a manner analogous to the values of the Path PV filter 450 is computed: An engineer may capture a time series at the error microphone, and time series at a point in the 3D grid. The complex transfer function (i.e., ratio) of these is computed. This can be done while driving at a typical speed on a typical road. This may also be performed while driving over a range of speeds over a range of roads and averaged or stored separately. The measurement quality can benefit from other interfering noise sources not being present such as conducing this measurement in a laboratory with the vehicle mounted on a dynamometer.

When the listener's head moves from one location to another location, the fastest method to deliver an optimal ANC experience (i.e. the fully adapted level of noise cancellation) at the ears of this head may not include simply switching between current secondary paths (e.g., from an a current secondary path 472 to a new current secondary path 470 and to wait for the filter controller 428 to adapt W-filter 426 to adapt, because this method may waiting for up to, for example, 4 seconds or more for the W-filter 426 to converge. The fastest way to deliver an optimal ANC experience is for the head tracking block 480 to measure the old and new coordinates of the location of the head and to retrieve these IRs from memory 503, form the ratios to compute filter coefficients for the Wfast filter 504 and apply these filter coefficients into Wfast filter 504, as this method may not require W-filter adaptation. In general, the Wfast filter 504 may be embodied in variety of ANC system topologies, many of which will be explained in order of increasing complexity in the following paragraphs:

1) Remote Microphone, but static PathPV (or PathPV filter 450): In one embodiment and in connection with the ANC system 500 shown in FIG. 5, in use, and when head movement is detected, the system 500 refrains from selecting filter coefficients for the filter associated with the new secondary path 470 and also refrains from selecting filter coefficients for the PathPV filter 450. In this case, the controller 509 disables the PathPV filter 450 and the system 500 (i.e., the controller 509) computes filter coefficients for the Wfast filter 504. In another embodiment, the controller 402 or 509 selects coefficients for the filter associated with the secondary path 470 and the PathPV filter 450 for a nominal head location and deviations from this location are accounted with changes to the Wfast filter 504 noted above. Each time the head tracker block (e.g., 480) determines that the head has moved to a new position, different filter coefficients for the Wfast filter 504 is selected. By head position, it is understood that this may entail a center of the head location, a front plane of the head location, exact 3D locations of ear canal openings, or other functionally equivalent methods to specify the location of the head via various head landmarks. By a new head position, this may entail a change in the location of the head as determined by a difference in any of the aforementioned functionally equivalent landmarks or methods that can be used to determine a head position. This method may be embodied by continuously loading new filter coefficients for the Wfast filter 504 at regular intervals, or the loading new filter coefficients for the Wfast filter 504 may be triggered by head movement beyond a predetermined threshold. In an embodiment, the system 500 may load new filter coefficients for the Wfast filter 504 for a projected future head position in effort to account for delays in the system 500 in the effort to deliver optimized cancellation. In one embodiment, the system 500 can apply components of the Wfast filter 504 to an update path (i.e., to the microphone signal or signals) to form new signal e'r(z) to aide noise cancellation or prevent divergence.

2) RM—with changing PathPV filter 450. In another embodiment, it may be desirable to select different or new filter coefficients for the secondary path 470 and PathPV 450 in the case of a lack of head movement after a period of time. For example, if head movement stops for a predetermined period time such as, for example, 10 seconds or more, it may be desirable for the ANC system 500 to set the Wfast filter 504 to zero (or to a predetermined value) by returning its coefficients to unity while simultaneously accounting for this new "steady-state" head location by loading the current location(s) of the into the filter associated with the secondary path 470 and the PathPV filter 450. In an embodiment, the system 400 or 500 may only load a new head location and change coefficients for the filter associated with the secondary path 470 and the PathPV filter 450 when the head remains in a position long enough to adapt to this new location. This may only be performed when the head has been in a steady state location in excess of a predetermined threshold amount of time. If this condition is true, this may indicate that a driver's head motion has stopped for some time.

3) ANC based on benefits of the Wfast filter 504. In another embodiment, an ANC system 550 as shown in connection with FIG. 6, may retain the benefits of the Wfast filter 504 to account for rapid or the occasional head movement away from a predetermined head location. The system 500 may be generally void of the PathPV filter 450 or the remote microphone 412. Thus, in this case, there are no coefficients for the PathPV filter 450 or impulse responses (IR) for the remote microphone 412 to update based on head location. With this system 550, the spatial variation in primary noise field and secondary noise field is similarly accounted for by a computation and application of the coefficients for the Wfast filter 504 that is appropriate for each 3D head location. In this instance, because the error microphones may be located on the headliner or headrest or seat back, both the primary and secondary noise field ratio that forms the Wfast filter 504 may be relative to the location 409 of the error microphone 408 and not to the location 411 of the remote microphone. In an embodiment, the Wfast filter 504 may also be applied to the $e_p(n)$ signals by the controllable filter 428 or other signal processing block (not shown) to aide adaptation.

The memory 503 stores the IRs of the primary and second paths at multiple head locations. In one example, when a fast head movement occurs, the steady state location may be a head location detected from a time period from, for example, up to ten seconds ago. This time duration may correspond to the time necessary for the RNC system 400 to fully adapt from a set of "converged" adaptive filters 426 to a second set of "converged" adaptive filters 426. For the EOC system 440, the steady state location for the head location may correspond to the head being present in its current location for a time period of, for example, 0.5 to 1 second.

In this case, even if a simple gain (e.g., −6 dB) is inserted by the adaptive filter 426, the adaptive filter controller 428 (or LMS controller) may immediately begin to adaptively increase a magnitude of the W-filters (or the first filter 504) to create a sufficient magnitude of anti-noise to maintain ideal noise cancellation while minimizing energy on the error signal, e(n). With the addition of the first filter 504 and as long as the PathPV filter 450 is correct, the adaptive controller 428 may continue adapting the adaptive filter 426 in the correct direction to quiet the passenger cabin by minimizing the estimated error signal $e_v(n)$ at the remote location 411 (or virtual microphone location).

The ANC system 500 generally performs the following operations to perform ANC based on head movements. For example, the controller 509 may determine whether any one or more of the adaptive filters 426 and in a steady state condition when whether a position of the head of the occupant is in a steady state condition. This steady state can be estimated simply by comparison of the duration of time that the head has been in its present location to a predetermined location. A typical adaptation time for an RNC system may be up to 4 seconds. The typical adaptation time is the time necessary for the RNC system to fully adapt its W-filters to achieve a steady state amount of noise cancellation, which is the maximum achievable noise cancellation by the system. This adaptation time may be set by a number of factors such as the step size. In typical operation, the RNC system continuously updates its W-filters (or adaptive filters). The update to the W-filters is often scaled by a factor such as the step size. The step size limits the maximum magnitude change of the W-filter, in effort to increase stability and prevent divergence. The higher the step size, the more the magnitude of the W-filter can change per update, making the system adapt faster, but this comes with the increased risk of system divergence, which is undesirable. Referring back to FIG. 5, the controller 509 may then determine whether the head has moved to a new position in a shorter time than any one or more of the adaptive filters 426 can maintain convergence based on a simple look up table that is stored on memory 503 in the system 500. After loading a new PathPV filter 450 or new secondary path 470, the head should remain in a location for a period of time in order for the W-filters 426 to converge fully. If a head is in a location for less than the time threshold, then the w-filters 426 may not be fully converged for this location but will instead be converged for a previous location. In an embodiment, if the head motion continues while the w-filters 426 have not yet reached steady state, then the updated to the W-fast filter 504 is to be based on the location where the filters were last in steady state. The controller 509 receives a signal from the head tracking block 480 that is indicative of the movement of the head and the speed in which the head moves to the new position.

The controller 509 may switch to a new Sv (420 or 470) for the new head location by utilizing a LUT stored in the memory 503. In addition, the controller 509 may switch to a new PATH PV for the new head location by utilizing another LUT stored in the memory 503. Each LUT may include filter coefficients that corresponds to the location of the head (e.g., spatial coordinates in x, y, and z axis for the new head location and corresponding filter coefficients).

In an embodiment, the controller 509 may adjust the adaptive filters 426 and the first filter 504 (or Wfast filter 504) to ensure that the estimate error signal $e_v(n)$ is smaller based on the newly detected fast head detection location when compared to utilizing the filter coefficients of only the adaptive filters 426. This aspect may enable the ANC system 406 for both systems 500 and 550 to avoid divergence and to accelerate the adaptation of the adaptive filers 426 and the first filter 504. The controller 509 may then switch the coefficients of the first filter 504. The controller 509 may then continue with the adaptation with a same step size and same leakage, etc. After this operation is performed, the controller 509 may then move back to determine if the head has moved to a new location and perform the subsequent operations noted above.

Figure 7:
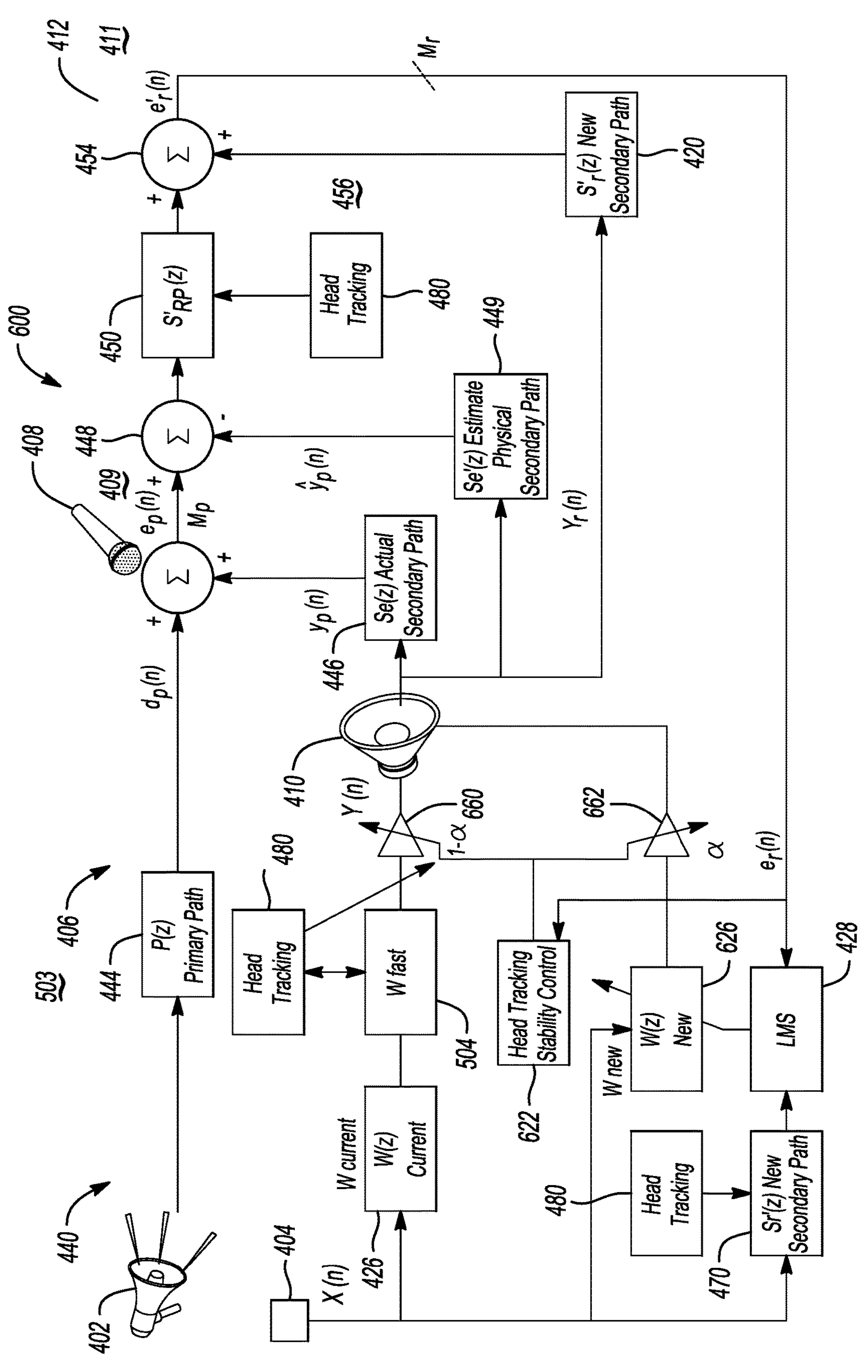
FIG. 7 depicts another system for eliminating noise cancellation artifacts due to head movement in accordance with another embodiment.

FIG. 7 depicts another system 600 for eliminating noise cancellation artifacts due to head movement in accordance with another embodiment. The system 600 is generally similar to the ANC system 406 as illustrated in connection with FIG. 4 and/or FIG. 5. The ANC system 600 further includes a headtracking stability control block 622, an adaptive filter 626, a first cross fader 660 and a second cross fader 662. The system 600 includes the head tracking block 480 and provides an input to the new secondary path 472 (or Sr'(z)). It is recognized that the head tracking block 480 generally includes a combination of hardware and software to provide information indicative of the disposition of the user's head in the vehicle. The headtracking block 480 may detect the positioned of the occupants' ears or head. As noted above, the headtracking block 480 may include a vehicle interior camera, a seat position sensor, etc. All of these devices are programmed to provide information corresponding to the location of the occupant's ear(s) or head in the vehicle. The head tracking block 480 includes memory (not shown) to provide multiple estimated secondary paths Sr'(z) for the new secondary path 470. Based on position of the occupants' ear or head, the head tracking block 480 selects the corresponding new estimated secondary path 470 (or adjust the filter coefficients to provide the new estimated secondary path).

In some conditions, as the head tracking block 480 switches to a new estimated secondary path 470 Sr'(z) based on a position of the occupants' head or ear, this condition may cause a boosting issue or undesirable performance due the large differences between the new location of the occupants' head or ear and corresponding new secondary path and the prior location of the occupants' head or ear and corresponding secondary path. To limit the boosting issue, the head tracking stability control block 662 is provided to maintain the RNC performance when switching between different estimated secondary paths Sr' 470, 472 as selected by head tracking block 480. The head tracking stability control block 608 adjusts variable a based on a power of residual signals P(n) which is defined by the following equation: P(n)=[e(n)]^2, where P(n) is the power of an $n^{th}$ microphone signal and e(n) is the $n^{th}$ microphone signal. Variable a is generally defined as cross fader that tunes the contribution between the current W filter 426 based on the old (or current secondary path 472) and the new W filter 626 based on the new secondary path. If the head tracking stability control block 608 determines that the residual signal, $P_{new}$ (n) is large or equal to $P_{current}(n)$, then the head tracking stability control block 608 determines that the new head tracking secondary path Sr'(z) is not stable. In this case, the head tracking stability control block 622 controls the second cross fader 662 to reduce the contribution from another adaptive filter 626 to reduce the contribution from the new secondary path 470 and controls the first cross fader 660 to increase the output from the adaptive filter 426. If the head tracking stability control block 622 determines that the residual signal, $P_{new}(n)$ is smaller than $P_{current}$ (n), then the head tracking stability control block 622 determines that new head tracking secondary path Sr'(z) is stable and stability control is not needed.

The controller 509 controls the first cross fader 460 and the second cross fader 462 by controlling variable a (or alpha cross fader variable). For example, the first cross fader 460 may be controlled based on 1−α and the second cross fader 462 may be controlled based on α.

Figure 8:
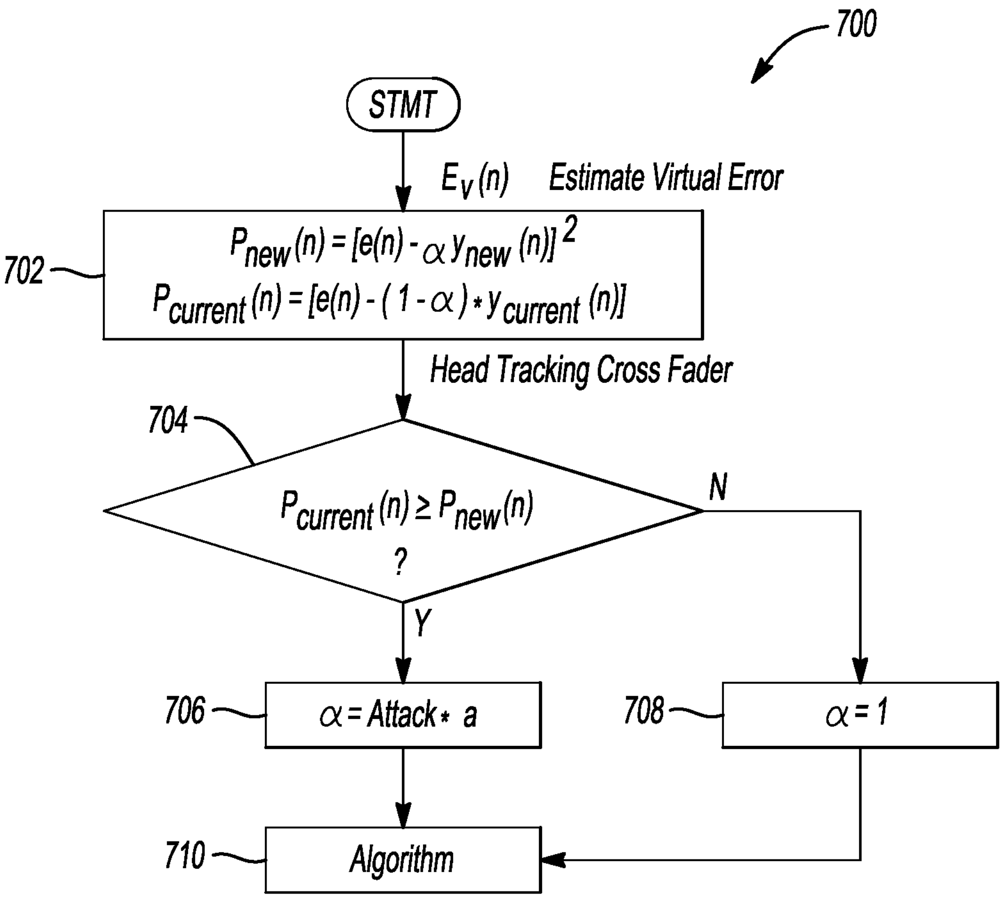
FIG. 8 depicts a method for determining a cross fader value for selecting an adaptive filter branch in accordance with another embodiment.

FIG. 8 depicts a method 700 for determining the alpha cross fader variable for the first cross fader 660 and the second cross fader 662 in accordance with one embodiment.

In operation 702, the head tracking stability control block 622 determines $P_{new}(n)$ based on the following equation:

$$P_{new}(n) = [e(n) - \alpha * y_{new}(n)]^2$$

Where $y_{current}(n)$ corresponds to the current anti-noise signal and $y_{new}(n)$ corresponds to the newly determined anti-noise signal. The controller 509 also determines $P_{current}$ (n) based on the following equation:

$$P_{current}(n) = [e(n) - (1 - \alpha) * y_{current}(n)]^2$$

In operation 704, the head tracking stability control block 622 compares $P_{current}(n)$ to $P_{new}(n)$. If $P_{new}(n)$ is greater than or equal than $P_{current}(n)$, then the method 700 moves to operation 706. If not, then the method 700 moves to operation 708.

In operation 706, the head tracking stability control block 622 establishes the alpha cross fader variable, a based on Attack*α. The variable ATTACK is constant value.

In operation 708, the head tracking stability control block 622 sets the alpha cross fader variable, α to unity (or 1).

In operation 710, the head tracking stability control block 622 controls the first cross fader 660 and/or the second cross fader 662 in the manner described above.

Although FIGS. 1, 3, 4, 5, 6, and 7 show LMS-based adaptive filter controllers 128, 328, 428, other methods and devices to adapt or create optimal controllable W-filters 126, 326, 426, are possible. For example, in one or more embodiments, neural networks may be employed to create and optimize W-filters in place of the LMS adaptive filter controllers. In other embodiments, machine learning or artificial intelligence may be used to create optimal W-filters in place of the LMS adaptive filter controllers. In one or more embodiments, LMS or MFxLMS may be used in place of FxLMS, with the appropriate and required changes to the block diagrams known to those of ordinary skill in the art.

Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof.

For example, the operation recited in any method or process claims may be executed in any order and are not limited to the specific order presented in the claims. Equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Further, functionally equivalent processing operations can be undertaken in either the time or frequency domain. Accordingly, though not explicitly stated for each signal processing block in the figures, the signal processing may occur in either the time domain, the frequency domain, or a combination thereof. Moreover, though various processing steps are explained in the typical terms of digital signal processing, equivalent steps may be performed using analog signal processing without departing from the scope of the present disclosure.

Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise cancellation (ANC) system comprising:
- at least one loudspeaker to project anti-noise sound within a cabin of a vehicle in response to receiving a first anti-noise signal;
- at least one microphone to provide an error signal indicative of noise and the anti-noise sound within the cabin;
- a head tracker sensor to provide a first signal indicative of a position of a user's head in a vehicle;
- at least one controllable filter programmed to:
  - modify a transfer function between the at least one microphone and at least one remote microphone location to generate an estimated remote microphone error signal based at least on the error signal and the first signal;
- generate the first anti-noise signal to account for the position of the user's head in the vehicle at least based on the estimated remote microphone error signal;
  - receive the first signal indicative of the position of the user's head in the vehicle;
  - modify a transfer function thereof in response to the first signal;
  - provide a second signal to generate the first anti-noise signal after modifying the transfer function; and
  - filter the first anti-noise signal based at least on the first signal; and
- a controller programmed to determine filter coefficients for the at least one controllable filter based on anti-noise that is present at a new location of the user's head and on anti-noise that is present at a previous location of the user's head.

2. The ANC system of claim 1 further comprising one or more cross faders to scale the manner in which the transfer function of the at least one controllable filter is modified over a period of time.

3. The ANC system of claim 1, wherein the head tracking sensor provides at least one of a head movement velocity and an amplitude of the head movement to the at least one controllable filter, and wherein the at least one controllable filter modifies the transfer function thereof based on the at least one of the head movement velocity and the amplitude of the head movement.

4. The ANC system of claim 1, wherein the controller is further programmed to disable the at least one controllable filter while the first anti-noise signal is being filtered in response to user's head moving to a new position in the vehicle.

5. The ANC system of claim 1, wherein the controller is further programmed to disable the at least one controllable filter at least in response to the user's head remaining in a same position or stops for a time period that exceeds a predetermined amount of time.

6. The ANC system of claim 1 wherein the at least one controllable filter is further programmed to generate a second anti-noise signal based at least on the estimated remote microphone error signal.

7. The ANC system of claim 6 further comprising a processor programmed to control at least one cross fader to limit an amount of anti-noise provided by the at least one controllable filter.

8. A method for performing active noise cancellation (ANC), the method comprising:

transmitting anti-noise sound within a cabin of a vehicle via a loudspeaker in response a first anti-noise signal;

providing an error signal indicative of noise and the anti-noise sound within the cabin;

providing, via a head tracking sensor, a first signal indicative of a position of a user's head in a vehicle;

modifying, via a at least one controllable filter, a transfer function to generate an estimated remote microphone error signal based at least on the error signal and the first signal; and generating, via the at least one controllable filter, the first anti-noise signal to account for the position of the user's head in the vehicle at least based on the estimated remote microphone error signal;

receiving, at the at least one controllable filter, the first signal indicative of the position of the user's head in the vehicle;

modifying a transfer function of the at least one controllable filter in response to the first signal;

generating the first anti-noise signal after modifying the transfer function;

filtering the first anti-noise signal based at least on the first signal; and determining filter coefficients, for the at least one controllable filter based on anti-noise that is present at a new location of the user's head and on anti-noise that is present at a previous location of the user's head.

9. The method of claim 8 further comprising scaling, via one or more cross faders, the manner in which the transfer function of the at least one controllable filter is modified over a period of time.

10. The method of claim 8 further comprising providing at least one of a head movement velocity and an amplitude of the head movement via the head tracking sensor to the at least one controllable filter, and wherein the head tracking sensor modifies the transfer function thereof based on the at least one of the head movement velocity and the amplitude of the head movement.

11. The method of claim 8 further comprising disabling the at least one controllable filter while the first anti-noise signal is being filtered in response to user's head moving to a new position in the vehicle.

12. The method of claim 8 further comprising disabling the at least one controllable filter in response to at least the user's head remaining in a same position or stopping for a time period that exceeds a predetermined amount of time.

13. The method of claim 8 further comprising generating a second anti-noise signal based at least on the estimated remote microphone error signal and an output.

14. The method of claim 13 further comprising controlling at least one cross fader to limit an amount of anti-noise provided by the at least one controllable filter.

15. An active noise cancellation (ANC) system comprising:

at least one loudspeaker to project anti-noise sound within a cabin of a vehicle in response to receiving a first anti-noise signal;

at least one microphone to provide an error signal indicative of noise and the anti-noise sound within the cabin;

a head tracker sensor to provide a first signal indicative of a position of a user's head in a vehicle;

at least one controllable filter programmed to:

generate the first anti-noise signal to in the vehicle at least based on an estimated remote microphone error signal;

modify the first anti-noise signal based on the position of the user's head;

receive the first signal indicative of the position of the user's head in the vehicle;

modify a transfer function thereof in response to the first signal;

provide a second signal to generate the first anti-noise signal after modifying the transfer function; and filter the first anti-noise signal based at least on the first signal; and a controller programmed to determine filter coefficients for the at least one controllable filter based on anti-noise that is present at a new location of the user's head and on anti-noise that is present at a previous location of the user's head.

* * * * *